US012549585B2

(12) United States Patent
Rowell et al.

(10) Patent No.: US 12,549,585 B2
(45) Date of Patent: *Feb. 10, 2026

(54) VULNERABILITY SCANNING OF HIDDEN NETWORK SYSTEMS

(71) Applicant: Charter Communications Operating, LLC, St. Louis, MO (US)

(72) Inventors: Jeffrey Rowell, Aurora, CO (US); Charles Manser, Clearwater, FL (US)

(73) Assignee: Charter Communications Operating, LLC, St. Louis, MO (US)

( * ) Notice: Subject to any disclaimer, the term of this patent is extended or adjusted under 35 U.S.C. 154(b) by 230 days.

This patent is subject to a terminal disclaimer.

(21) Appl. No.: 18/072,057

(22) Filed: Nov. 30, 2022

(65) Prior Publication Data

US 2024/0179172 A1    May 30, 2024

(51) Int. Cl.
*H04L 9/40*    (2022.01)

(52) U.S. Cl.
CPC .................... *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 8,281,402 B2 * | 10/2012 | Sahita | ................. | H04L 63/1433 726/25 |
| 10,298,611 B1 * | 5/2019 | Caldwell | ............... | H04L 63/029 |
| 10,999,307 B2 * | 5/2021 | Drake | ..................... | G06F 21/57 |
| 2010/0175135 A1 * | 7/2010 | Kandek | ................... | H04L 63/20 709/224 |
| 2013/0247184 A1 * | 9/2013 | Mahadik | ............. | H04L 63/1433 726/22 |
| 2014/0032449 A1 * | 1/2014 | Kacin | ................. | H04L 41/0883 707/741 |
| 2014/0344937 A1 * | 11/2014 | Sabin | .................. | H04L 63/1433 726/25 |
| 2017/0366437 A1 * | 12/2017 | Bonica | .................. | H04L 43/103 |
| 2019/0050578 A1 * | 2/2019 | Choi | ........................ | G06F 21/53 |
| 2019/0281072 A1 * | 9/2019 | Al Khater | ........... | H04L 63/1408 |
| 2019/0342325 A1 * | 11/2019 | Blass | .................. | H04L 63/1433 |
| 2020/0233965 A1 * | 7/2020 | Inokuchi | ............... | G06F 21/577 |
| 2021/0185073 A1 * | 6/2021 | Ewaida | ............... | H04L 63/1433 |
| 2021/0226981 A1 * | 7/2021 | Huffman | ............. | G06F 16/1734 |

(Continued)

FOREIGN PATENT DOCUMENTS

CN          115296888 B   * 11/2023

*Primary Examiner* — Kambiz Zand
*Assistant Examiner* — Afaq Ali
(74) *Attorney, Agent, or Firm* — Dority & Manning, P.A.

(57) ABSTRACT

A network vulnerability scanning system scans a target device for vulnerabilities to obtain network connection data for the target device. The network vulnerability scanning system determines the network connection data includes a network connection between the target device and a hidden network system. The network vulnerability scanning system installs a network scanning application on the target device in response to determining the network connection data includes the network connection between the target device and the hidden network system. The network vulnerability scanning system scans the hidden network system for vulnerabilities via the network scanning application installed on the target device.

20 Claims, 4 Drawing Sheets

(56) References Cited

U.S. PATENT DOCUMENTS

2022/0245258 A1* 8/2022 Shivanna .............. G06F 21/577
2022/0345483 A1* 10/2022 Shua ..................... H04L 9/0825
2024/0179171 A1* 5/2024 Rowell ............... H04L 63/1433

* cited by examiner

VULNERABILITY SCANNING OF HIDDEN NETWORK SYSTEMS

BACKGROUND

Devices on a network can be scanned for vulnerabilities. For instance, a network vulnerability scanning system can perform a vulnerability scan of a device on the network to identify one or more vulnerabilities of the device. Furthermore, one or more actions (e.g., applying a software patch) can be performed to resolve the identified vulnerabilities of the device on the network.

SUMMARY

The embodiments disclosed herein implement vulnerability scanning of hidden networks that are inaccessible by a network vulnerability scanning system to identify vulnerabilities of the hidden network.

In one aspect, a method is provided. The method includes scanning, by a network vulnerability scanning system, a target device to obtain network connection data for the target device. The method includes determining the network connection data includes a network connection between the target device and a hidden network system. The method includes installing a network scanning application on the target device in response to determining the network connection data includes the network connection between the target device and the hidden network system. The method includes scanning the hidden network system for vulnerabilities via the network scanning application installed on the target device.

In another aspect, a system is provided. The system includes a device and a network vulnerability scanning system. The network vulnerability scanning system includes one or more processors configured to obtain network connection data for the device. The one or more processors are configured to determine the network connection data includes a network connection between the device and a hidden network system. The one or more processors are configured to install a network scanning application on the target device in response to determining the network connection data includes the network connection between the target device and the hidden network system. The one or more processors are configured to scan the hidden network system for vulnerabilities through the network scanning application installed on the target device.

In yet another aspect, a non-transitory computer-readable storage medium is provided. The non-transitory computer readable-storage medium includes executable instructions configured to cause one or more computing devices of a network vulnerability scanning system to obtain network connection data for a target device. The executable instructions further cause the one or more computing devices to determine the network connection data includes a network connection between the target device and a hidden network system. The executable instructions further cause the one or more computing devices to install a network scanning application on the target device in response to determining the network connection data includes the network connection between the target device and the hidden network system. The executable instructions further cause the one or more computing devices to scan the hidden network system for vulnerabilities via the network scanning application installed on the target device.

In one aspect a method is provided. The method includes scanning, by a network vulnerability scanning system, a target device for vulnerabilities to obtain initial network connection data for the target device via a first network interface of the target device. The initial network connection data identifies an initial network connection between the target device and a first hidden network system. The method includes installing, by the network vulnerability scanning system, a network scanning application on the target device subsequent to scanning the target device for vulnerabilities to obtain the initial network connection data for the target device. The method includes scanning the first hidden network system for vulnerabilities via the network scanning application installed on the target device. Subsequent to scanning the first hidden network system for vulnerabilities, the method includes obtain additional network connection data for the target device via the first network interface of the target device. The additional network connection data identifies an additional network connection between the target device and a second hidden network system that is different from the first hidden network system.

In another aspect, a system is provided. The system includes a target device and a network vulnerability scanning system that includes one or more computing devices. The computing device(s) are configured to scan the target device for vulnerabilities to obtain initial network connection data for the target device via a first network interface of the target device. The initial network connection data identifies an initial network connection between the target device and a first hidden network system. The computing device(s) are further configured to install a network scanning application on the target device subsequent to scanning the target device for vulnerabilities to obtain the initial network connection data. The computing device(s) are further configured to scan the first hidden network system via the network scanning application installed on the target device. Subsequent to scanning the first hidden network system for vulnerabilities, the computing device(s) are configured to obtain additional network connection data for the target device via the first network interface of the target device. The additional network connection data includes an additional network connection between the target device and a second hidden network system.

In yet another aspect, a non-transitory computer-readable storage is provided. The non-transitory computer-readable store medium includes executable instructions configured to cause one or more computing devices of a network vulnerability scanning system to scan a target device for vulnerabilities to obtain initial network connection data for the target device via a first network interface of the target device. The initial network connection data identifies an initial network connection between the target device and a first hidden network system. The computing device(s) are further configured to install a network scanning application on the target device subsequent to scanning the target device for vulnerabilities to obtain the initial network connection data. The computing device(s) are further configured to scan the first hidden network system via the network scanning application installed on the target device. Subsequent to scanning the first hidden network system for vulnerabilities, the computing device(s) are configured to obtain additional network connection data for the target device via the first network interface of the target device. The additional network connection data includes an additional network connection between the target device and a second hidden network system.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
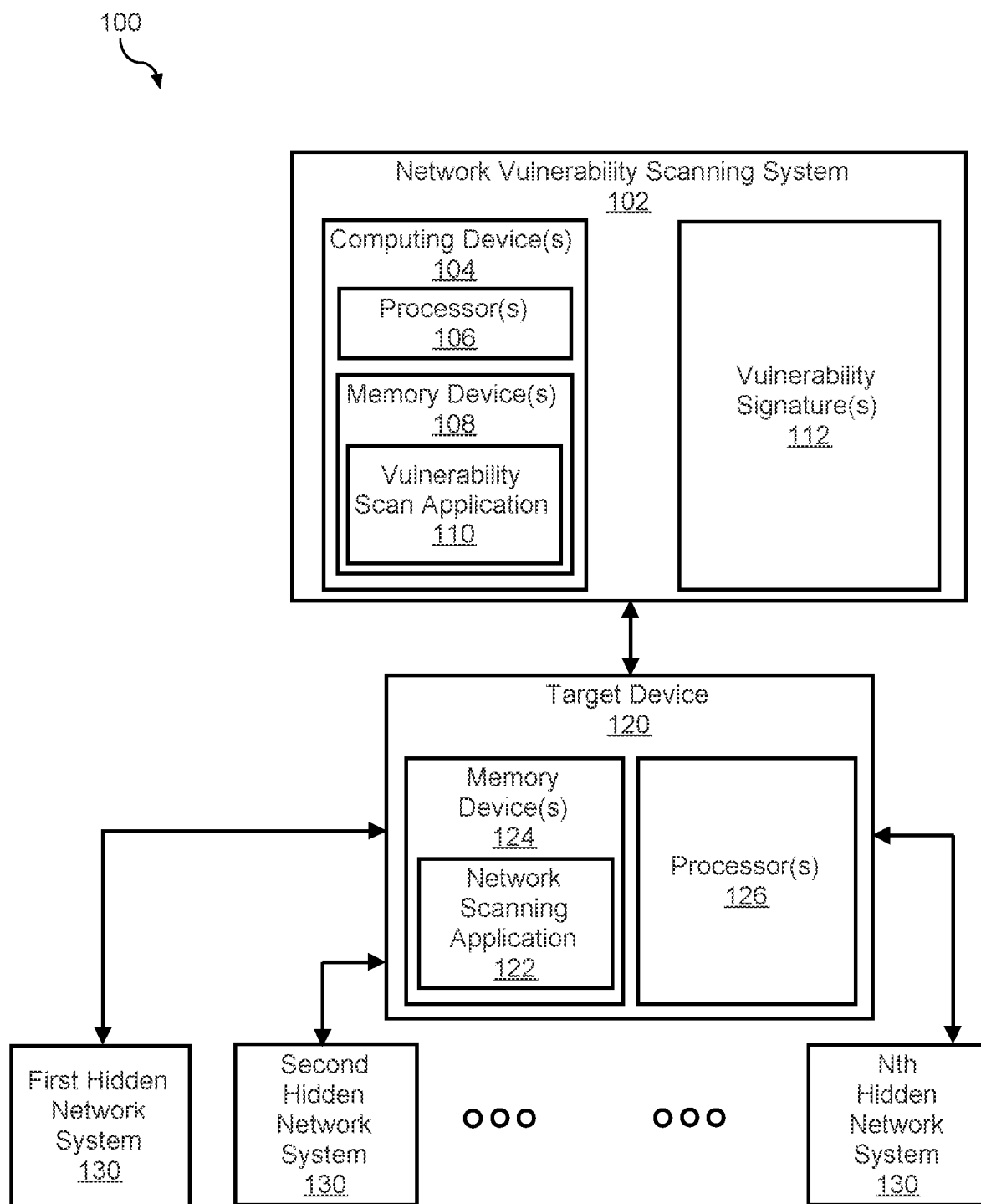
FIG. 1 is a system for vulnerability scanning hidden network systems according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

As used herein, the term "vulnerability" refers to any risk, non-compliance, or other undesirable artifact. For instance, a vulnerability may include any weakness which may allow an attacker to reduce a system's security. In another instance, the vulnerability may be a flaw in a physical or software based structure or any weakness in design, implementation, operation, or internal control. Further non-limiting examples of vulnerabilities may include one or more of backdoors, overflow vulnerabilities, software vulnerabilities (e.g., old versions, obsolete software, software bugs, etc.), viruses, trojan horses, spyware, default or weak passwords, insecure network architecture, and hardware vulnerabilities (e.g., unauthorized devices, obsolete devices, incompatible devices, malfunctioning devices, protocol weaknesses, etc.), brute force attacks, web applications vulnerabilities (e.g. buffer overflow, directory traversal, etc.), DNS and BIND vulnerabilities, database vulnerabilities (e.g., weak password, guessed name, default logins, default accounts, etc.), operating system vulnerabilities (e.g., patches, versions, etc.), e-commerce vulnerabilities (e.g., security, encryption, form manipulation, etc.), FTP vulnerabilities, firewall vulnerabilities (e.g., open ports, DNS, admin ports, etc.), remote services, etc.

As used herein, the term "target device" refers to a device that is reachable by a network vulnerability scanning system. More specifically, the network vulnerability scanning system can send a request (e.g., ping command) over a network and the target device can respond to the request. It should be understood that the target device and the network vulnerability scanning system are under common control (that is, controlled by the same entity).

As used herein, the term "hidden network system" as used herein refers to a network system that is unreachable by the network vulnerability scanning system. More specifically, a request (e.g., ping command) sent by the network vulnerability scanning system will not be received by the hidden network system and therefore the hidden network system is unreachable by the network vulnerability scanning system.

As used herein, the term "network interface" refers to a physical or virtual port that establishes a network connection between the target device and another system (e.g., network vulnerability scanning system, hidden network system, etc.).

Example aspects of the present disclosure are directed to vulnerability scanning. A network vulnerability scanning system can perform a vulnerability scan (e.g., credentialed vulnerability scan) of a target device. As part of the vulnerability scan, the network vulnerability scanning system can obtain network connection data for the target device. The network connection data can, for example, include a list of network connections between the target device and other devices/networks. In some instances, the network connection data can include a network connection between the target device and a hidden network system that is unreachable by the network vulnerability scanning system. It should be appreciated that the target device can include a plurality of network interfaces (e.g., physical ports and/or virtual ports) and a respective network interface of the plurality of network interfaces can establish the network connection between the target device and the hidden network system. It should also be appreciated that the security of the target device can be compromised since the target device is connected to the hidden network system that is unreachable by the network vulnerability scanning system and therefore cannot be scanned by the network vulnerability scanning system.

Example aspects of the present disclosure are directed to vulnerability scanning the hidden network system. The network vulnerability scanning system can be configured to install a network scanning application on the target device in response to determining the network connection data for the target device includes the network connection between the target device and the hidden network system.

In some implementations, the network scanning application can receive one or more commands (e.g., application programming interface (API) calls) from the network vulnerability scanning system and requests data from the hidden network system based, at least in part, on the received command(s). The hidden network system can communicate the requested data to the network scanning application. The network scanning application can then communicate the requested data to the network vulnerability scanning system.

In some implementations, the network vulnerability scanning system can be configured to compare requested data from the hidden network system to a plurality of different vulnerability signatures. For instance, the network vulnerability scanning system can be configured to determine the hidden network system has a vulnerability if the requested data from the hidden network system corresponds (e.g., matches) to one of the plurality of different vulnerability signatures.

In some implementations, the network vulnerability scanning system can be configured to uninstall network scanning application on the target device subsequent to scanning the hidden network system for vulnerabilities via the network scanning application. For instance, in some implementations, the network vulnerability scanning system can send one or more commands to the target device to stop executing the network scanning application and delete the network scanning application from memory of the target device. In this manner, memory space on the target device can be conserved and can accommodate other applications specific to the target device.

In some implementations, the network scanning application can be permanently installed on the device. In such implementations, the network scanning application can be executed continuously or at regular intervals to provide real-time or near real-time scanning of the previously identified hidden network system or other hidden network systems that may connect to the target device over time.

In some implementations, the target device can include a network interface that functions as a feedback loop to identify additional network connections established after current network connections for the target device have been scanned for vulnerabilities. More specifically, additional network connection data for the target device can be provided to the network vulnerability scanning system via the network interface. In this manner, the network vulnerability scanning system can automatically scan the additional network connections for vulnerabilities.

Example aspects of the present disclosure can provide numerous technical effects and benefits. For instance, installing the network scanning application on the target device can allow the network vulnerability scanning system to scan a hidden network system that is connected to the target device and otherwise unreachable by the network vulnerability scanning system. In this manner, security of the target device can be improved, because the network vulnerability scanning system can scan the hidden network system for vulnerabilities via the network scanning application installed on the target device.

Referring now to the FIGS., FIG. 1 depicts a system 100 for vulnerability scanning hidden network systems according to some implementations of the present disclosure. The system 100 can include a network vulnerability scanning system 102 that includes one or more computing devices 104. The computing device(s) 104 can include one or more processors 106 and one or more memory devices 108. The memory device(s) 108 can be configured to store a vulnerability scan application 110.

In some implementations, the memory device(s) 108 can be further configured to store a plurality of different vulnerability signatures 112. In alternative implementations, the network vulnerability scanning system 102 can include a database (not shown) configured to store the plurality of different vulnerability signatures 112. In such implementations, the computing device(s) 104 can be communicatively coupled to the database.

The system 100 can further include a target device 120 that is reachable by the network vulnerability scanning system 102. In some implementations, the target device 120 can be a router. It should be understood, however, that the target device 120 can include any suitable device capable of communicating with one or more devices over a network (e.g., wired or wireless).

Since the target device 120 is reachable by the network vulnerability scanning system 102, the network vulnerability scanning system 102 can perform a vulnerability scan of the target device 120. More specifically, the computing device(s) 104 of the network vulnerability scanning system 102 can execute the vulnerability scan application 110 to scan the target device 120 for vulnerabilities.

It should be appreciated that, in some implementations, the network vulnerability scanning system 102 can perform a credentialed vulnerability scan of the target device 120. In this manner, the network vulnerability scanning system 102 can obtain data (e.g., system files) associated with the target device 120 that could not be obtained by performing a non-credentialed vulnerability scan of the target device 120.

By performing the vulnerability scan of the target device 120, the network vulnerability scanning system 102 can obtain network connection data for the target device 120. In some implementations, the network connection data can include a list of internet protocol (IP) addresses of devices and/or network systems currently connected to the target device 120. For example, the network connection data for the target device 120 can include an IP address for one or more hidden network systems 130 that are not reachable by the network vulnerability scanning system 102. Therefore, the network vulnerability scanning system 102 can determine a network connection exists between the target device 120 and the hidden network system(s) 130.

The network vulnerability scanning system 102 can be configured to install a network scanning application 122 on the target device 120 in response to determining the network connection between the target device 120 and the hidden network system(s) 130. For instance, the network scanning application 122 can be machine-readable instructions that the network vulnerability scanning system 102 can communicate to the target device 120. In some implementations, the target device 120 can include one or more memory devices 124 configured to store the network scanning application 122. Furthermore, the target device 120 can include one or more processors 126 configured to execute the network scanning application 122.

Once the network scanning application 122 is installed on the target device 120, the network vulnerability scanning system 102 can perform a vulnerability scan of the hidden network system(s) 130 via the target device 120, specifically the network scanning application 122 executing thereon. For instance, in some implementations, the network scanning application 122 can be an application programming interface (API) that receives commands (e.g., application programming interface (API) calls) from the network vulnerability scanning system 102 and requests data from the hidden network system(s) 130 based, at least in part, on the received commands.

The network scanning application 122 can configure the target device 120 to communicate the data received from the hidden network system(s) 130 to the network vulnerability scanning system 102. In this manner, the network vulnerability scanning system 102 can process the data received from the hidden network system(s) 130 via the network scanning application 122 executing on the target device 120 to determine one or more vulnerabilities of the hidden network system(s) 130.

In some implementations, the network vulnerability scanning system 102 can compare the data received from the hidden network system(s) 130 to the plurality of different vulnerability signatures 112. For instance, the network vulnerability scanning system 102 can be configured to determine vulnerabilities exist on the hidden network system(s) 130 if the data received from the hidden network system(s) 130 corresponds (e.g., matches) one of the plurality of different vulnerability signatures 112. It should be appreciated, however, that the scope of the present disclosure can include any suitable manner known in the art for determining whether the data received from the hidden network system(s) 130 is representative of one or more vulnerabilities.

Figure 2:
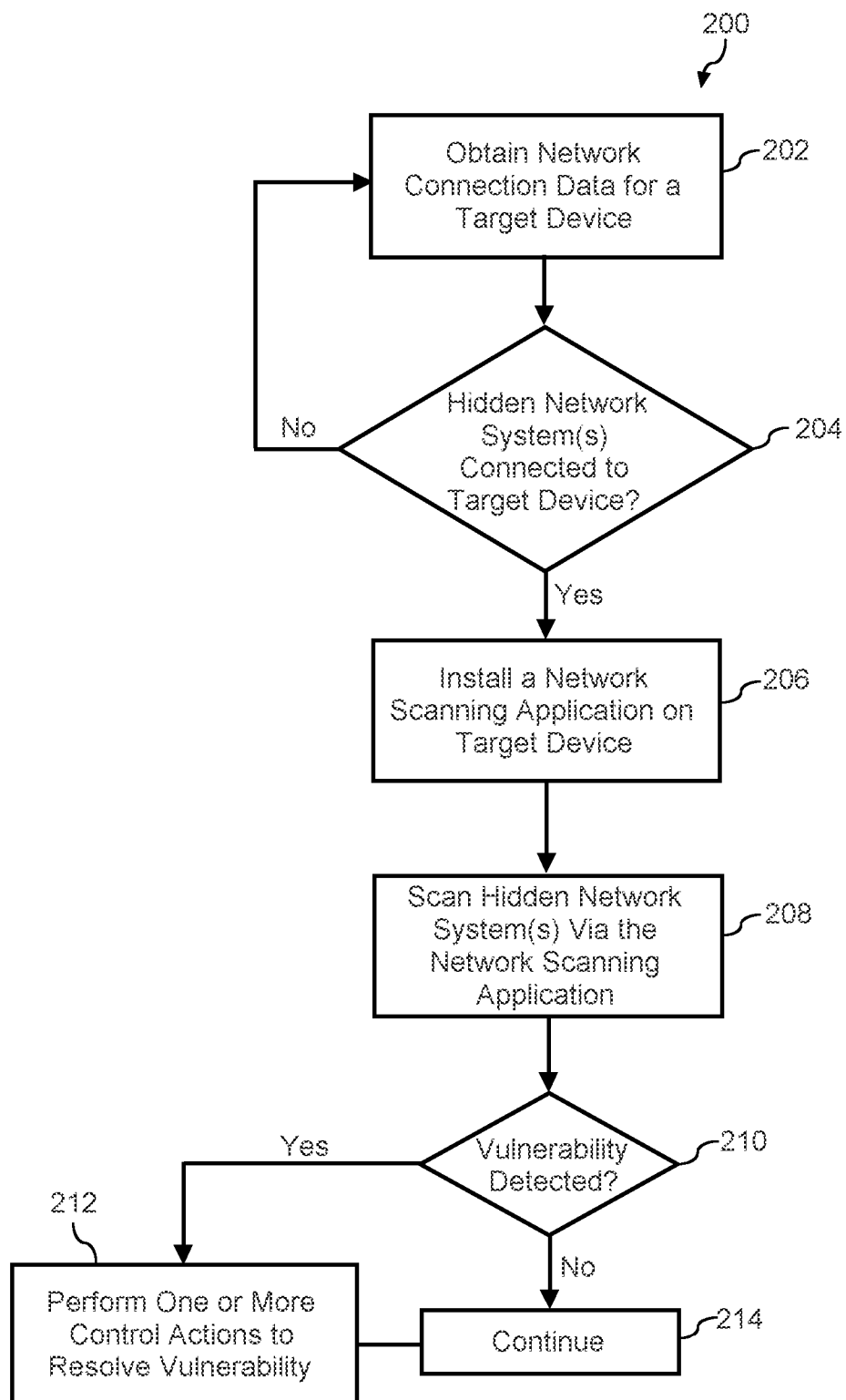
FIG. 2 is a flowchart of a method for vulnerability scanning hidden network systems according to some implementations of the present disclosure.

Referring now to FIG. 2, a flow diagram of an example method 200 for vulnerability scanning a hidden network system is provided according to some implementations of the present disclosure. The method 200 can be implemented by the system 100 discussed above with reference to FIG. 1. FIG. 2 depicts steps performed in a particular order for purposes of illustration and discussion. Those of ordinary skill in the art, using the disclosure provided herein, will understand that various steps of the method 200 may be adapted, modified, rearranged, performed simultaneously, or modified in various ways without deviating from the scope of the present disclosure.

At (202), the method 200 includes obtaining network connection data for the target device 120. For instance, in some implementations, the network vulnerability scanning system 102 can perform a credentialed vulnerability scan of the target device 120 to obtain the network connection data for the target device 120. In some implementations, the network connection data can include a plurality of different internet protocol (IP) addresses for devices/systems that are connected to the target device 120.

At (204), the method 200 includes determining the network connection data obtained at (202) includes a network connection between the target device 120 and one or more of the hidden network systems 130. For instance, in some implementations, the network vulnerability scanning system 102 can be configured to compare the plurality of IP addresses included in the network connection data obtained at (202) to a list of IP addresses of network systems that are reachable by the network vulnerability scanning system 102. If the network vulnerability scanning system 102 determines one or more of the IP addresses included in the network connection data obtained at (202) is not included in the list of IP addresses to which the network vulnerability scanning system has connectivity with, the method 200 proceeds to (206). Otherwise, the method 200 reverts to (202).

At (206), the method 200 includes installing the network scanning application 122 on the target device 120. For instance, in some implementations, the network vulnerability scanning system 102 can install the network scanning application 122 on the target device 120 on the fly. In such implementations, the network scanning application 122 can be machine-readable instructions included in one or more data packets the network vulnerability scanning system 102 communicates to the target device 120 over a wired or wireless connection.

At (208), the method 200 includes scanning the hidden network system(s) 130 via the network scanning application 122 installed on the target device 120 at (206). In some implementations, the network vulnerability scanning system 102 can communicate one or more commands (e.g., a first data packet) to the target device 120. The network scanning application 122 installed on the target device 120 can cause the target device 120 to request data from the hidden network system(s) 130. The hidden network system(s) 130 can communicate the requested data (e.g., second data packet) to the target device 120. The network scanning application 122 can configure the target device 120 to communicate the requested data to the network vulnerability scanning system 102.

At (210), the method 200 includes determining the hidden network system has one or more vulnerabilities based, at least in part, on the scan performed at (208). In some implementations, the network vulnerability scanning system can compare the requested data (e.g., second data packet) obtained from the hidden network system(s) 130 to a plurality of different vulnerability signatures. If the data obtained from the hidden network system(s) 130 corresponds to one of the plurality of vulnerability signatures, the method 200 can proceed to (212). Otherwise, the method 200 can proceed to (214).

At (212), the method 200 includes performing one or more control actions in response to determining, at (210), one or more vulnerabilities of the hidden network system(s) 130. For instance, in some implementations, the determined vulnerability of the hidden network system(s) 130 can be an outdated version of a software application executing on the hidden network system(s) 130 that compromises the security of the hidden network system(s) 130 as well as the target device 120 to which the hidden network system(s) 130 are currently connected. In such implementations, the one or more control actions performed by the network vulnerability scanning system 102 at (212) can include providing a software update to the hidden network system(s) 130 via the network scanning application 122 installed on the target device 120. The software update can be associated with updating the software application to the most-recent version of the software application to resolve the security threat to the hidden network system(s) 130 and the target device 120.

In some implementations, the one or more control actions can include generating a notification indicative of one or more vulnerabilities of the hidden network systems(s) 130. For instance, the notification can be an electronic notification (e.g., email, short message service (SMS) text, etc.). The electronic notification can prompt a user (e.g., IT specialist) to perform one or more maintenance actions on the hidden network system(s) 130 to resolve the one or more vulnerabilities of the hidden network system(s) 130. It should be appreciated that the method 200 can proceed to (214) after performing the one or more control actions at (212).

At (214), the method 200 can continue. In some implementations, the method 200 can include uninstalling the network scanning application 122 from the target device 120. For instance, in some implementations, the network vulnerability scanning system 102 can communicate one or more commands to the target device 120 to prompt the target device 120 to remove the network scanning application 122 from the memory device(s) 124 of the target device 120. In this manner, available space of the memory device(s) 124 can be increased to accommodate other applications that are specific to the target device 120.

In some implementations, the method 200 can, at (214), revert to (202) and can perform a vulnerability scan of the target device 120 to obtain network connection data for the target device 120. In this manner, the target device 120 can be scanned to check to see if an additional hidden network system has connected to the target device 120 since the most-recent scan of the target device 120.

Figure 3:
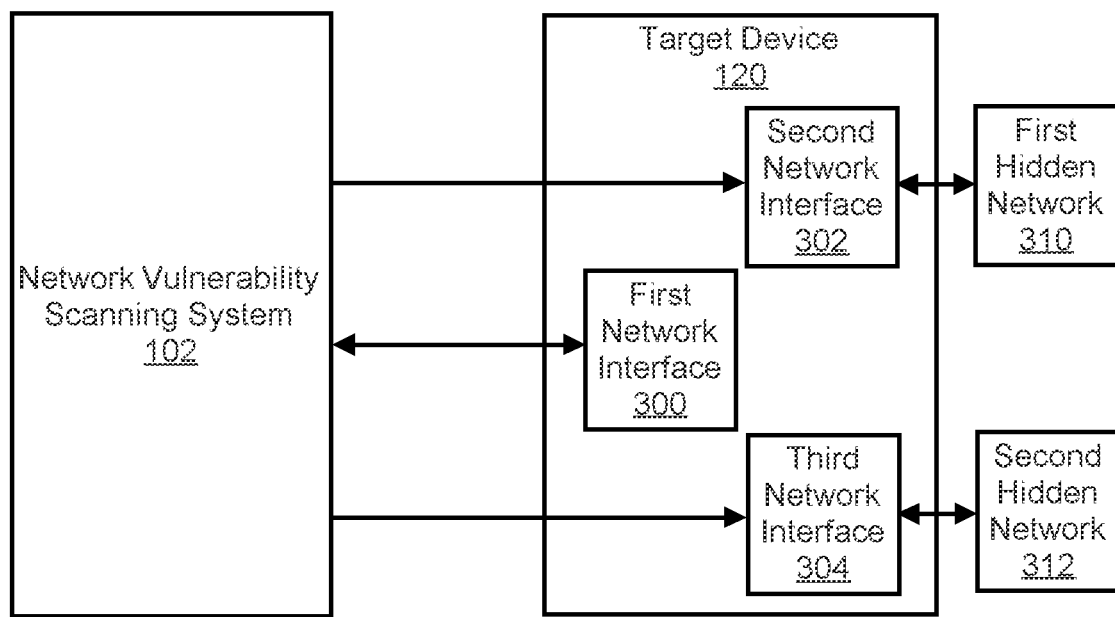
FIG. 3 is a feedback loop between a network vulnerability scanning system and a target device according to some implementations of the present disclosure.

Referring now to FIG. 3, a system diagram of a feedback loop between the network vulnerability scanning system 102 and the target device 120 is provided according to some implementations of the present disclosure. The network vulnerability scanning system 102 can scan the target device 120 for initial network connection data via a first network interface 300 of the target device 120 to obtain initial network connection data for the target device 120. The initial network connection data can include one or more initial network connections between the target device and one or more of the plurality of hidden network systems 130 (FIG. 1). For instance, the initial network connections can include a connection between the target device 120 and a first hidden network system 310. More specifically, the connection between the target device 120 and the first hidden network system 310 can be established via a second network interface 302 of the target device 120 that is different from the first network interface 300.

After the initial vulnerability scan of the target device 120 is performed to obtain the initial network connection data for the target device 120, the network vulnerability scanning system 102 can, as discussed above with reference to FIGS. 1 and 2, install the network scanning application 122 (FIG. 1) on the target device 120 and scan the initial network connection(s) for vulnerabilities. For instance, the network scanning application 122 can scan the second network interface 302 of the target device 120 for vulnerabilities of the first hidden network system 310.

It should be appreciated that additional hidden network systems 130 (FIG. 1) can connect to the target device 120 after the initial network connections after scanned for vulnerabilities. For instance, an additional network connection can be established between the target device 120 and a second hidden network system 312 of the plurality of hidden network systems 130 via a third network interface 304 of the target device 120 that is different from both the first network interface 300 and the second network interface 302. The first network interface 300 establishing the network connection between the network vulnerability scanning system 102 and the target device 120 can provide a feedback loop for communicating data indicative of the additional network connections for the target device 120 to the network vulnerability scanning system 102. In this manner, the network vulnerability scanning system 102 can be configured to automatically scan the additional network connections for vulnerabilities and can therefore improve the security of the target device 120 against vulnerabilities of hidden network systems 130 that connect to the target device 120. For instance, the network scanning application installed on the target device 120 can scan the third network interface 304 of the target device 120 for vulnerabilities of the second hidden network system 312 that connected to the target device 120 after the previous vulnerability scan of the initial network connections (e.g., first hidden network system 310).

Figure 4:
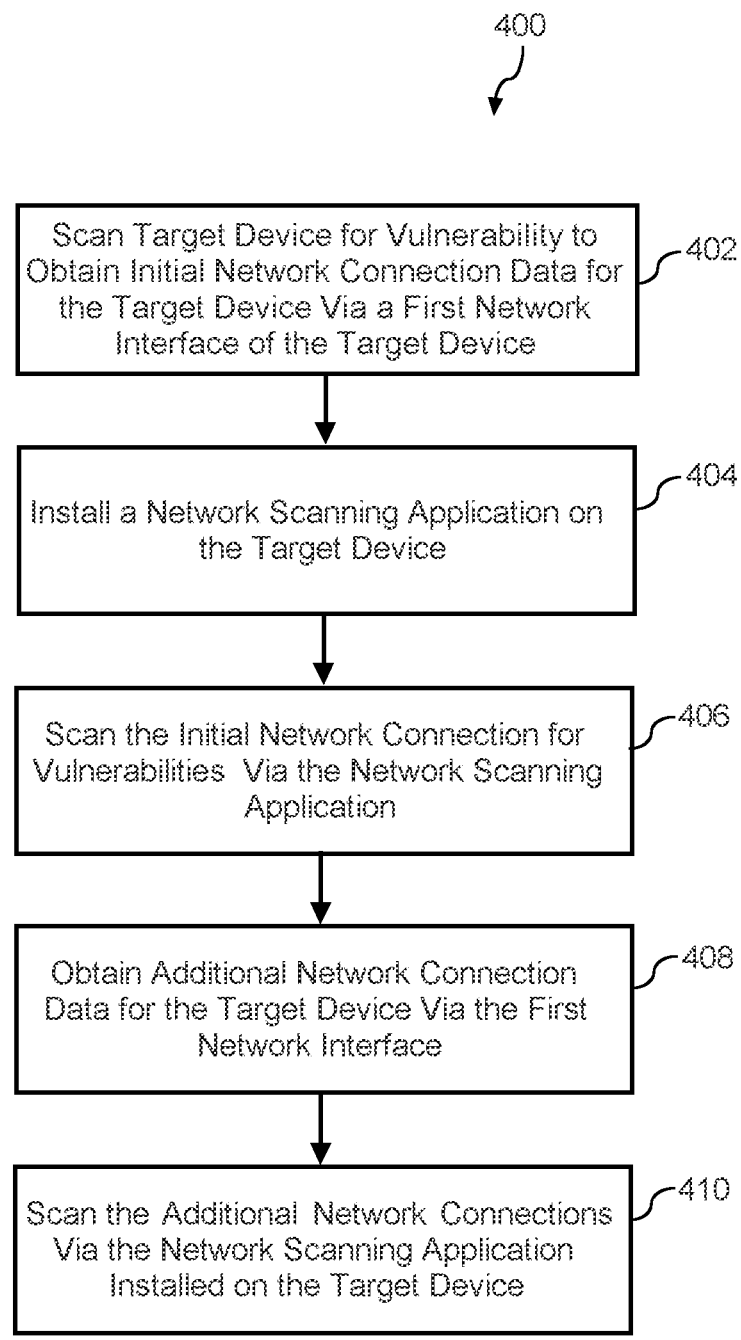
FIG. 4 is a flowchart of a method for automatically identifying additional network connections for the target device according to some implementations of the present disclosure.

Referring now to FIG. 4, a flow diagram of an example method 400 for vulnerability scanning hidden network systems connected to a target device is provided according to some implementations of the present disclosure. The method 400 can be implemented by the system 100 discussed above with reference to FIGS. 1 and 3. FIG. 4 depicts steps performed in a particular order for purposes of illustration and discussion. Those of ordinary skill in the art, using the disclosure provided herein, will understand that various steps of the method 400 may be adapted, modified, rearranged, performed simultaneously, or modified in various ways without deviating from the scope of the present disclosure.

At (402), the method 400 can include scanning the target device 120 for vulnerabilities to obtain initial network connection data for the target device 120 via the first network interface 300 of the target device 120. The initial network connection data can include an initial network connection between the target device 120 and the first hidden network system 310 of the plurality of hidden network systems 130. It should be appreciated that the initial network connection between the target device 120 and the first hidden network system 310 can be established via the second network interface 302 of the target device 120.

At (404), the method 400 can include installing a network scanning application on the target device. At (406), the method 400 includes scanning the initial network connection for vulnerabilities via the network scanning application 122 installed on the target device 120 at (404). More specifically, the network vulnerability scanning system 102 can scan the second network interface 302 for vulnerabilities of the first hidden network system 310.

At (408), the method 400 can include obtaining additional network connection data for the target device 120 via the first network interface 300 of the target device 120. It should be appreciated that the additional network connection data can be obtained subsequent to scanning the initial network connection for vulnerabilities at (406). The additional network connection data can include an additional network connection between the target device 120 and the second hidden network system 312 of the plurality of hidden network systems 130. It should be appreciated that the additional network connection can be established via the third network interface 304 of the target device 120.

At (410), the method 400 can include scanning the additional network connection for vulnerabilities via the network scanning application 122 installed on the target device 120 at (404). More specifically, the network vulnerability scanning system 102 can scan the third network interface 304 for vulnerabilities of the second hidden network system 312.

Individuals will recognize improvements and modifications to the preferred examples of the disclosure. All such improvements and modifications are considered within the scope of the concepts disclosed herein and the claims that follow.

What is claimed is:

1. A method comprising:
prior to installing a network scanning application on a target device, obtaining, by a network vulnerability scanning system comprising a computing device from the target device, via a first network system, network connection data for the target device, wherein the computing device is a different device from the target device, the network connection data comprising a list of internet protocol (IP) addresses of network systems currently connected to the target device;
determining, by the network vulnerability scanning system based on the network connection data, that the network connection data includes a network connection between the target device and a hidden network system that is unreachable by the computing device;
installing, by the network vulnerability scanning system, the network scanning application on the target device in response to determining that the network connection data includes the network connection between the target device and the hidden network system that is unreachable by the computing device; and
scanning, by the network vulnerability scanning system, the hidden network system for vulnerabilities via the network scanning application installed on the target device.

2. The method of claim 1, wherein obtaining the network connection data for the target device includes performing, by the network vulnerability scanning system, a credentialed vulnerability scan of the target device to obtain the network connection data for the target device.

3. The method of claim 1, wherein scanning the hidden network system for vulnerabilities includes:
providing, by the network vulnerability scanning system, a first data packet to the hidden network system via the network scanning application installed on the target device; and
receiving, by the network vulnerability scanning system, a second data packet from the hidden network system via the network scanning application installed on the target device, the second data packet responsive to the first data packet.

4. The method of claim 1, wherein installing the network scanning application on the target device includes communicating, by the network vulnerability scanning system, one or more data packets to the target device, the one or more data packets including machine-readable instructions executable by the target device to implement the network scanning application.

5. The method of claim 1, further comprising:
uninstalling, by the network vulnerability scanning system, the network scanning application from the target device subsequent to scanning the hidden network system for vulnerabilities.

6. The method of claim 1, further comprising:
determining, by the network vulnerability scanning system, the hidden network system has one or more vulnerabilities based, at least in part, on scanning the hidden network system.

7. The method of claim 6, further comprising:
performing one or more control actions in response to determining the one or more vulnerabilities of the hidden network system.

8. The method of claim 7, wherein the one or more control actions comprise communicating, by the network vulnerability scanning system, a software update to the hidden network system via the network scanning application installed on the target device, the software update associated with updating a software application executing on the hidden network system.

9. The method of claim 1, wherein the network connection data includes a plurality of internet protocol (IP) addresses, and wherein one of the IP addresses is associated with the hidden network system.

10. The method of claim 1, wherein the hidden network system is unreachable from the computing device such that a ping command sent by the computing device to the hidden network system is not responded to by the hidden network system.

11. A system comprising:
a network vulnerability scanning system comprising one or more computing devices configured to:
prior to installing a network scanning application on a target device, obtain, from the target device, via a first network system, network connection data for the target device, wherein the one or more computing devices are different devices from the target device, the network connection data comprising a list of internet protocol (IP) addresses of network systems currently connected to the target device;
determine, based on the network connection data, that the network connection data includes a network connection between the target device and a hidden network system that is unreachable by the one or more computing devices;
install the network scanning application on the target device in response to determining that the network connection data includes the network connection between the target device and the hidden network system that is unreachable by the one or more computing devices; and
scan the hidden network system for vulnerabilities via the network scanning application installed on the target device.

12. The system of claim 11, wherein to obtain the network connection data, the one or more computing devices are configured to authenticate the target device to perform a credential scan of the target device to obtain the network connection data for the target device.

13. The system of claim 11, wherein to scan the hidden network system via the network scanning application installed on the target device, the one or more computing devices are configured to:
provide a first data packet to the hidden network system via the network scanning application installed on the target device; and
receive a second data packet from the hidden network system via the network scanning application installed on the target device, the second data packet being different than the first data packet and responsive to the first data packet.

14. The system of claim 11, wherein to install the network scanning application on the target device, the one or more computing devices are configured to communicate one or more data packets to the target device, the one or more data packets including machine-readable instructions executable by the target device to implement the network scanning application.

15. The system of claim 11, wherein the one or more computing devices are further configured to:
uninstall the network scanning application from the target device subsequent to scanning the hidden network system for vulnerabilities.

16. The system of claim 11, wherein the one or more computing devices are further configured to:
determine the hidden network system has a vulnerability based, at least in part, on the scan of the hidden network system via the network scanning application installed on the target device.

17. The system of claim 16, wherein the one or more computing devices are further configured to:
perform one or more control actions in response to determining the hidden network system has the vulnerability.

18. The system of claim 17, wherein the one or more control actions comprise communicating a software update to the hidden network system via the network scanning application installed on the target device, the software update associated with updating a software application executing on one or more hidden network devices on the hidden network system.

19. The system of claim 11, wherein the target device is a router.

20. A non-transitory computer-readable storage medium that includes executable instructions configured to cause one or more computing devices of a network vulnerability scanning system to:
prior to installing a network scanning application on a target device, obtain, from the target device, via a first network system, network connection data for the target device, wherein the one or more computing devices are different devices from the target device, the network connection data comprising a list of internet protocol (IP) addresses of network systems currently connected to the target device;

determine, based on the network connection data, that the network connection data includes a network connection between the target device and a hidden network system that is unreachable by the one or more computing devices;

install the network scanning application on the target device in response to determining that the network connection data includes the network connection between the target device and the hidden network system that is unreachable by the one or more computing devices; and scan the hidden network system for vulnerabilities via the network scanning application installed on the target device.

* * * * *